United States Patent
Sekine et al.

(10) Patent No.: US 11,952,501 B2
(45) Date of Patent: Apr. 9, 2024

(54) INK SET AND INK JET RECORDING METHOD

(71) Applicant: Seiko Epson Corporation, Tokyo (JP)

(72) Inventors: Midori Sekine, Matsumoto (JP); Kyohei Tanaka, Matsumoto (JP); Kiyoshi Nakamura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 134 days.

(21) Appl. No.: 17/559,208

(22) Filed: Dec. 22, 2021

(65) Prior Publication Data
US 2022/0195226 A1 Jun. 23, 2022

(30) Foreign Application Priority Data
Dec. 23, 2020 (JP) .................. 2020-213287

(51) Int. Cl.
*C09D 11/40* (2014.01)
*B41J 2/01* (2006.01)
(Continued)

(52) U.S. Cl.
CPC ............... *C09D 11/40* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002;
(Continued)

(56) References Cited

U.S. PATENT DOCUMENTS

2009/0169834 A1* 7/2009 Sano .................. C09D 11/322
427/256
2012/0003435 A1* 1/2012 Kameyama .......... C09D 11/101
522/27
(Continued)

FOREIGN PATENT DOCUMENTS

CN 102993827 A 3/2013
CN 108367581 A 8/2018
(Continued)

*Primary Examiner* — Manish S Shah
(74) *Attorney, Agent, or Firm* — Harness, Dickey & Pierce, P.L.C.

(57) ABSTRACT

An ink set of radiation curable ink jet compositions, includes: an under layer ink; and an over layer ink, and the under layer ink contains, as a polymerizable compound, 80.0 percent by mass or more of a monofunctional polymerizable compound with respect to a total mass of polymerizable compounds and contains 55.0 percent by mass or more of a polymerizable compound having a nitrogen heterocyclic structure and/or a polymerizable compound having a hydroxy group in total with respect to the total mass of the polymerizable compounds.

10 Claims, 1 Drawing Sheet

(51) Int. Cl.
  *B41J 2/21* (2006.01)
  *B41J 11/00* (2006.01)
  *B41M 5/00* (2006.01)
  *C09D 11/037* (2014.01)
  *C09D 11/107* (2014.01)
  *C09D 11/322* (2014.01)
  *C09D 11/54* (2014.01)

(52) U.S. Cl.
  CPC ........ *B41J 11/0021* (2021.01); *B41M 5/0023* (2013.01); *C09D 11/037* (2013.01); *C09D 11/107* (2013.01); *C09D 11/322* (2013.01); *C09D 11/54* (2013.01)

(58) Field of Classification Search
  CPC .... B41J 2/04581; B41J 2/055; B41J 2/16538; B41J 2002/16502; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | | |
|---|---|---|---|
| 2013/0065029 A1 | 3/2013 | Fujii | |
| 2013/0222497 A1* | 8/2013 | Nakano | B41J 2/2107 347/100 |
| 2015/0275001 A1* | 10/2015 | Yoda | B41J 2/2107 522/64 |
| 2017/0218216 A1* | 8/2017 | Kubota | B41J 2/01 |
| 2018/0282559 A1 | 10/2018 | Umebayashi | |
| 2020/0255682 A1 | 8/2020 | Tanaka et al. | |
| 2021/0071024 A1* | 3/2021 | Tanaka | C09D 11/322 |

FOREIGN PATENT DOCUMENTS

| | | |
|---|---|---|
| CN | 111546775 A | 8/2020 |
| JP | 2006-181801 A | 7/2006 |
| JP | 2020-139050 A | 9/2020 |

* cited by examiner

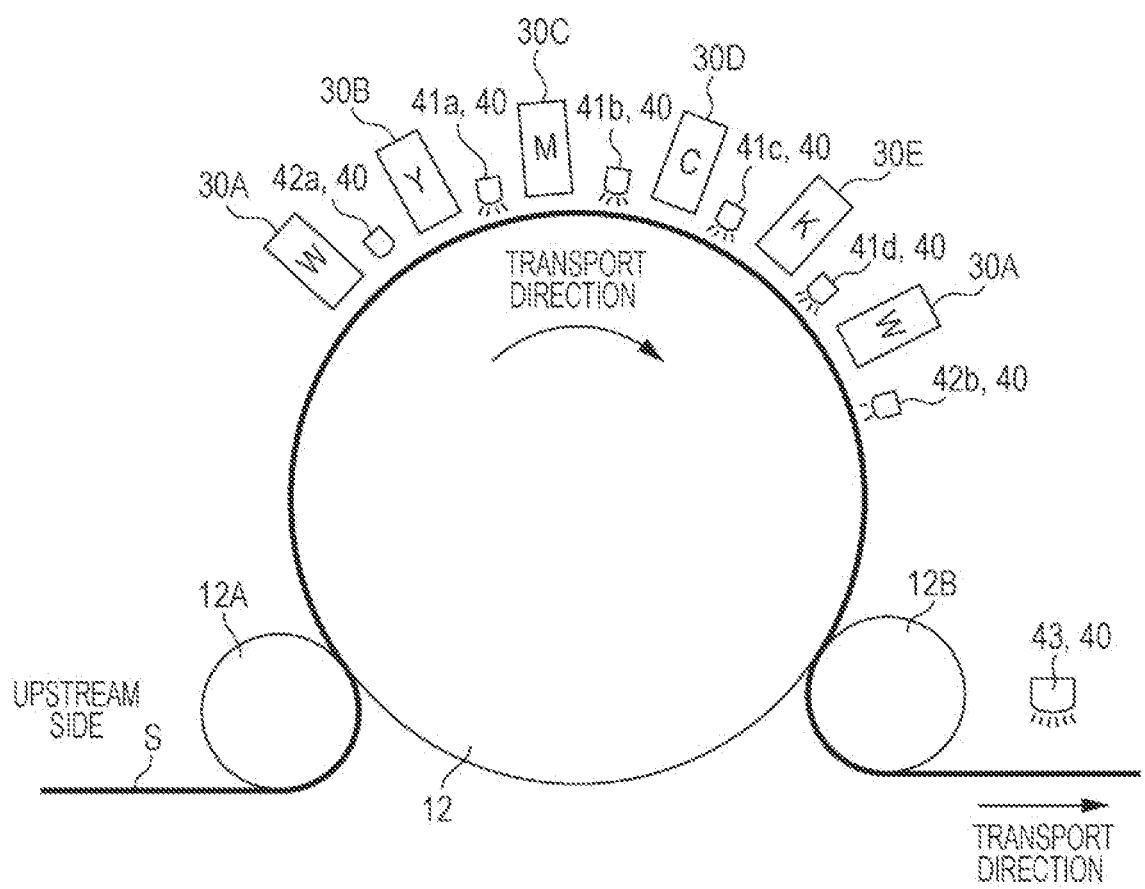

INK SET AND INK JET RECORDING METHOD

The present application is based on, and claims priority from JP Application Serial Number 2020-213287, filed Dec. 23, 2020, the disclosure of which is hereby incorporated by reference herein in its entirety.

BACKGROUND

1. Technical Field

The present disclosure relates to an ink set and an ink jet recording method.

2. Related Art

Heretofore, as a recording method to form an image on a recording medium, such as paper, based on an image data signal, various methods have been used. Among those methods, since an ink jet method performs image formation directly on a recording medium by ejecting an ink only to a necessary image portion by an inexpensive apparatus, the ink can be efficiently used, and in addition, a running cost is low. Furthermore, since generating a low noise, the ink jet method is excellent as the recording method.

In recent years, in order to form a printing image excellent, for example, in water resistance, solvent resistance, and abrasion resistance on a surface of a recording medium, in an ink jet type recording method, a radiation curable ink to be cured by being irradiated with radioactive rays (such as light or ultraviolet rays) has been used.

In addition, a recording method in which various types of radiation curable inks are sequentially overcoated one on another has been widely performed. For example, inks having colors different from each other, such as cyan (C), magenta (M), yellow (Y), black (K), and white (W), are overcoated one on another to form a color image, or in order to protect an image or to impart glossiness thereto, a colorless and transparent under layer ink may be overcoated on a color image in some cases.

For example, JP-A-2006-181801 has disclosed a method for overcoating energy ray curable ink compositions. According to this method, after a print coating film is formed on a recording member using a color ink composition (Ia) for energy curable ink jet recording, a clear ink coating film is formed on the above coating film using an under layer ink composition (Ib) for energy curable ink jet recording so that a surface tension Sa (mN/m) of Ia coated as an under layer and a surface tension Sb (mN/m) of Ib coated as an upper layer have a relationship of Sb<Sa. The above patent document has also disclosed that repellence of the composition of the upper layer formed on the print coating film is decreased.

In general, when an image is formed using a curable type composition, for example, in order to improve adhesion of the image to a recording medium, a large amount of a monofunctional polymerizable compound which is likely to form a relatively flexible cured material may be blended in some cases. The case in which an image is formed by overcoating is similar to the case described above, and when a large amount of a monofunctional polymerizable compound is used for a composition which forms a cured coating film, the adhesion of the coating film to a recording medium is believed to be improved.

However, when a large amount of a monofunctional polymerizable compound is blended in a composition which forms an under layer in the overcoating, it becomes understood that wet spreadability of a composition of an over layer is not likely to be secured only by adjusting the relationship in surface tension between the composition of the under layer and the composition of the over layer.

SUMMARY

According to an aspect of the present disclosure, there is provided an ink set of radiation curable ink jet compositions, the ink set comprising an under layer ink and an over layer ink. In the ink set described above, the under layer ink contains, as a polymerizable compound, 80.0 percent by mass or more of a monofunctional polymerizable compound with respect to a total mass of polymerizable compounds and contains 55.0 percent by mass or more of a polymerizable compound having a nitrogen heterocyclic structure and/or a polymerizable compound having a hydroxy group in total with respect to the total mass of the polymerizable compounds.

According to another aspect of the present disclosure, there is provided an ink jet recording method using the ink set described above, the method comprising: a first adhesion step of adhering the under layer ink to a recording medium; a first curing step of forming an under layer cured film by irradiating the under layer ink on the recording medium with radioactive rays; a second adhesion step of adhering the over layer ink to the under layer cured film; and a second curing step of forming an over layer cured film by irradiating the over layer ink on the under layer cured film with radioactive rays.

BRIEF DESCRIPTION OF THE DRAWING

FIGURE is a schematic view of one example of a head unit and a transport unit of a recording apparatus usable in an embodiment.

DESCRIPTION OF EXEMPLARY EMBODIMENTS

Hereinafter, some embodiments of the present disclosure will be described. The following embodiments are described to explain examples of the present disclosure. The present disclosure is not limited to the following embodiments and may include various changed and/or modified embodiments to be performed without departing from the scope of the present disclosure. In addition, all components to be described below are not always required to be essential components of the present disclosure.

1. Ink Set

An ink set according to this embodiment is an ink set of radiation curable ink jet compositions and includes an under layer ink and an over layer ink. The radiation curable ink jet composition is cured when irradiated with radioactive rays. As the radioactive rays, for example, ultraviolet rays, electron rays, infrared rays, visible light rays, and X-rays may be mentioned. As the radioactive rays, ultraviolet rays are preferable since radiation sources thereof are easily available and widely used, and materials suitably cured when irradiated with ultraviolet rays are also easily available and widely used.

1.1. Under Layer Ink

The under layer ink is a radiation curable ink jet composition. In this specification, the "under layer" and the "over layer" simply represent a relative positional relationship in an image to be obtained by overcoating of inks and may also be called "under coating" and "over coating", respectively. The under layer ink contains at least one polymerizable compound.

The under layer ink contains, as the polymerizable compound, 80.0 percent by mass or more of at least one monofunctional polymerizable compound with respect to a total mass of polymerizable compounds and 55.0 percent by mass or more of a polymerizable compound having a nitrogen heterocyclic structure and/or a polymerizable compound having a hydroxy group in total with respect to the total mass of the polymerizable compounds.

1.1.1. Polymerizable Compound

The under layer ink contains, as the polymerizable compound, the monofunctional polymerizable compound and the polymerizable compound having a nitrogen heterocyclic structure and/or the polymerizable compound having a hydroxy group. The under layer ink may also contain at least one polymerizable compound other than those mentioned above. Furthermore, the polymerizable compounds described above may be used alone, or at least two types thereof may be used in combination. In addition, among the polymerizable compounds in this specification, a compound having a molecular weight of 1,000 or less may be called a "monomer" in some cases, and for example, a "monofunctional monomer" and a "polyfunctional monomer" are called a "monofunction monomer" and a "polyfunction monomer", respectively, in some cases.

Hereinafter, after the polymerizable compound to be contained in the under layer ink is described by way of example, the monofunctional polymerizable compound, the polymerizable compound having a nitrogen heterocyclic structure, and the polymerizable compound having a hydroxy group will be described.

1.1.1.(1) Polymerizable Compound

The under layer ink may contain a vinyl ether group-containing (meth)acrylate ester. That is, the under layer ink may contain a vinyl ether group-containing (meth)acrylate ester represented by the following formula (I) as the polymerizable compound.

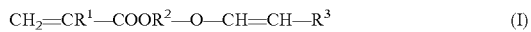

$$CH_2=CR^1-COOR^2-O-CH=CH-R^3 \quad (I)$$

In the formula (I), $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms. In addition, in this specification, the vinyl ether group-containing (meth)acrylate ester corresponds to the polyfunction monomer.

In this specification, a "(meth)acrylate" represents at least one of an acrylate and a methacrylate corresponding thereto, a "(meth)acryloyl" represents at least one of an acryloyl and a methacryloyl corresponding thereto, and a "(meth)acryl" represents at least one of an acryl and a methacryl corresponding thereto.

When the under layer ink contains the vinyl ether group-containing (meth)acrylate ester described above, a curing property can be further improved, and in addition, an effect to further decrease the viscosity may also be expected. In addition, compared to the case in which a compound having a vinyl ether group and a compound having a (meth)acrylate group are used together, a compound having a vinyl ether group and a (meth)acrylate group in its molecule is more preferably used in terms of improvement in ink curing property.

In the above formula (I), as the divalent organic residue having 2 to 20 carbon atoms represented by $R^2$, for example, a substituted or unsubstituted linear, branched, or cyclic alkylene group having 2 to 20 carbon atoms, a substituted or unsubstituted alkylene group having 2 to 20 carbon atoms and at least one oxygen atom derived from an ether bond and/or an ester bond in its structure, or a substituted or unsubstituted divalent aromatic group having 6 to 11 carbon atoms is preferably used. Among those mentioned above, an alkylene group, such as an ethylene group, an n-propylene group, an isopropylene group, or a butylene group, having 2 to 6 carbon atoms or an alkylene group, such as an oxyethylene group, an oxy-n-propylene group, an oxyisopropylene group, or an oxybutylene group, having 2 to 9 carbon atoms and an oxygen atom derived from an ether bond in its structure may be preferably used.

In the above formula (I), as the monovalent organic residue having 1 to 11 carbon atoms represented by $R^3$, for example, a substituted or unsubstituted linear, branched, or cyclic alkyl group having 1 to 10 carbon atoms or a substituted or unsubstituted aromatic group having 6 to 11 carbon atoms is preferably used. Among those mentioned above, an alkyl group, such as a methyl group or an ethyl group, having 1 to 2 carbon atoms or an aromatic group, such as a phenyl group or a benzyl group, having 6 to 8 carbon atoms is preferably used.

When the organic residues are each a substituted group, the substituent thereof is classified into a group having at least one carbon atom and a group having no carbon atoms. First, when the substituent is a group containing at least one carbon atom, the number of carbon atom thereof is counted as the number of carbon atoms of the organic residue. Although the group having at least one carbon atom is not limited to those mentioned below, for example, a carboxy group or an alkoxy group may be mentioned. Next, although the group containing no carbon atoms is not limited to those mentioned below, for example, a hydroxy group or a halogen group may be mentioned.

Although the vinyl ether group-containing (meth)acrylate ester is not limited to those mentioned below, for example, there may be mentioned 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)

acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, (meth)acrylic acid polyethylene glycol monovinyl ether, or (meth)acrylic acid polypropylene glycol monovinyl ether.

Among those compounds mentioned above, since the viscosity of the ink can be further decreased, the flashing point is high, and the curing property of the ink is excellent, 2-(vinyloxyethoxy)ethyl (meth)acrylate, that is, at least one of 2-(vinyloxyethoxy)ethyl acrylate and 2-(vinyloxyethoxy)ethyl methacrylate is preferable, and 2-(vinyloxyethoxy)ethyl acrylate (VEEA) is more preferable. In particular, since 2-(vinyloxyethoxy)ethyl acrylate and 2-(vinyloxyethoxy)ethyl methacrylate each have a simple structure and a small molecular weight, the viscosity of the ink can be significantly decreased. As 2-(vinyloxyethoxy)ethyl methacrylate, 2-(2-vinyloxyethoxy)ethyl methacrylate or 2-(1-vinyloxyethoxy)ethyl methacrylate may be mentioned, and as 2-(vinyloxyethoxy)ethyl acrylate, 2-(2-vinyloxyethoxy)ethyl acrylate or 2-(1-vinyloxyethoxy)ethyl acrylate may be mentioned. In addition, in terms of the curing property, 2-(vinyloxyethoxy)ethyl acrylate is superior to 2-(vinyloxyethoxy)ethyl methacrylate.

The vinyl ether group-containing (meth)acrylate ester may be used alone, or at least two types thereof may be used in combination.

The under layer ink may contain various monomers, such as a monofunctional monomer, a difunctional monomer, and a polyfunctional monomer having at least three functional groups, and/or oligomers thereof. As the monomer described above, for example, there may be mentioned an unsaturated carboxylic acid, such as (meth)acrylic acid, itaconic acid, crotonic acid, isocrotonic acid, maleic acid, or its salt; an ester, an urethane, an amide, or an anhydride of an unsaturated carboxylic acid; a vinyl compound, such as acrylonitrile or styrene; an unsaturated polyester, an unsaturated polyether, an unsaturated polyamide, or an unsaturated urethane. In addition, for example, an oligomer, such as a linear acrylic oligomer, formed from a monomer, epoxy (meth)acrylate, oxetane (meth)acrylate, an aliphatic urethane (meth)acrylate, or an aromatic (meth)acrylate may be mentioned.

In addition, as other monofunction monomers and polyfunction monomers, an N-vinyl compound may also be contained. As the N-vinyl compound, for example, there may be mentioned N-vinylformamide, N-vinylcarbazole, N-vinylacetamide, N-vinylpyrrolidone, N-vinylcaprolactam, acryloylmorpholine, or derivatives thereof.

Among the (meth)acrylates mentioned above, as the monofunctional (meth)acrylate, for example, there may be mentioned isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexy-diglycol (meth)acrylate, 2-hydroxybutyl (meth)acrylate, 4-hydroxybutyl (meth)acrylate (4-HBA), butoxyethyl (meth)acrylate, ethoxy diethylene glycol (meth)acrylate, methoxy diethylene glycol (meth)acrylate, methoxy polyethylene glycol (meth)acrylate, methoxy polypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate, or dicyclopentenyloxyethyl (meth)acrylate. Among those mentioned above, phenoxyethyl (meth)acrylate is preferable.

Among the above (meth)acrylates, as the difunctional (meth)acrylate, for example, there may be mentioned triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, EO (ethylene oxide) adduct di(meth)acrylate of bisphenol A, PO (propylene oxide) adduct di(meth)acrylate of bisphenol A, hydroxypivalic acid neopentyl glycol di(meth)acrylate, or polytetramethylene glycol di(meth)acrylate. Among those mentioned above, dipropylene glycol di(meth)acrylate (DPGDA) is preferable.

Among the (meth)acrylates mentioned above, as a polyfunctional (meth)acrylate having at least three functional groups, for example, there may be mentioned trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritol ethoxy tetra(meth)acrylate, or caprolactam-modified dipentaerythritol hexa(meth)acrylate.

The polymerizable compounds mentioned above may be used alone, or at least two types thereof may be used in combination.

The under layer ink may also contain a nitrogen-containing monofunction monomer. Although the nitrogen-containing monofunction monomer is not particularly limited, for example, there may be mentioned a nitrogen-containing monofunctional vinyl monomer, such as N-vinylcaprolactam, N-vinylformamide, N-vinylcarbazole, N-vinylacetamide, vinyl methyl oxazolidinone (VMOX), or N-vinylpyrrolidone; a nitrogen-containing monofunctional acrylate monomer such as acryloyimorpholine; or a nitrogen-containing monofunctional acrylamide monomer, such as (meth)acrylamide, N-hydroxymethyl (meth)acrylamide, diacetone (meth)acrylamide, N,N-dimethyl (meth)acrylamide, or a (meth)acrylamide derived, for example, from dimethylamino ethylacrylate, benzyl chloride quaternary.

Among those mentioned above, one of the nitrogen-containing monofunctional vinyl monomer and the nitrogen-containing monofunctional acrylate monomer is preferably selected, a monomer having a nitrogen heterocyclic structure, such as N-vinylcaprolactam, N-vinylcarbazole, N-vinylpyrrolidone, or acryloyimorpholine (ACMO), is more preferable, and acryloylmorpholine is further preferably contained.

When the nitrogen-containing monofunction monomer as described above is used, the abrasion resistance of the coating film tends to be further improved. Furthermore, the nitrogen-containing monofunctional acrylate monomer, such as acryloylmorpholine, having a nitrogen heterocyclic structure tends to further improve a stretching property and adhesion of the coating film.

A content of the nitrogen-containing monofunction monomer used in the under layer ink with respect to the total mass of the polymerizable compounds is preferably 2.0 to 15.0 percent by mass, more preferably 3.0 to 13.0 percent by mass, and further preferably 4.0 to 12.0 percent by mass. Since the content of the nitrogen-containing monofunction monomer with respect to the total mass of the polymerizable compounds is in the range described above, the abrasion resistance and the adhesion of the coating film tend to be further improved.

The under layer ink may also contain a monofunctional (meth)acrylate having a cross-linked condensed ring structure. As the monofunctional (meth)acrylate having a cross-linked condensed ring structure, for example, dicyclopentenyl (meth)acrylate, dicyclopentenyl oxyethyl(meth)acrylate, or dicyclopentanyl (meth)acrylate may be mentioned. The cross-linked condensed ring structure indicates the structure in which at least two ring structures commonly have one side therebetween, and at least two atoms not adjacent to each other in the same ring structure or in the ring structures different from each other are bonded to each other.

Among those mentioned above, dicyclopentenyl (meth) acrylate (DCPA) is more preferably contained. Since the monofunctional (meth)acrylate having a cross-linked condensed ring structure as described above is used, in addition to the tendency to further improve the abrasion resistance, the stretching property, and the adhesion of the coating film, a decrease in glossiness of the coating film of the under layer ink tends to be further suppressed.

A content of the monofunctional (meth)acrylate having a cross-linked condensed ring structure of the under layer ink with respect to the total mass of the polymerizable compounds is preferably 5.0 to 65.0 percent by mass, more preferably 10.0 to 63.0 percent by mass, and further preferably 15.0 to 60.0 percent by mass. Since the content of the monofunctional (meth)acrylate having a cross-linked condensed ring structure with respect to the total mass of the polymerizable compounds is in the range described above, the adhesion and the abrasion resistance of the coating film tend to be further improved.

The under layer ink may also contain an aromatic group-containing monofunction monomer. Although the aromatic group-containing monofunction monomer is not particularly limited, for example, there may be mentioned phenoxyethyl (meth)acrylate (PEA), benzyl (meth)acrylate (BZA), alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, or 2-hydroxy-3-phenoxypropyl (meth)acrylate.

Among those mentioned above, phenoxyethyl (meth) acrylate or benzyl (meth)acrylate is preferable, and phenoxyethyl (meth)acrylate (PEA) is further preferable. Since the aromatic group-containing monofunction monomer as described above is used, solubility of a polymerization initiator is further improved, and the curing property of the under layer ink tends to be further improved. In particular, when an acylphosphine oxide-based polymerization initiator or a thioxantone-based polymerization initiator is used, the solubility thereof tends to be improved.

The under layer ink may also contain a saturated aliphatic group-containing monofunction monomer. Although the saturated aliphatic group-containing monofunction monomer is not particularly limited, for example, there may be mentioned an alicyclic group-containing (meth)acrylate, such as 3,3,5-trimethylhexyl (meth)acrylate, isobornyl (meth)acrylate, tert-butylcyclohexanol (meth)acrylate, or 2-(meth)acrylic acid-1,4-dioxaspiro[4.5]dec-2-ylmethyl; a linear or branched aliphatic group-containing (meth)acrylate, such as isoamyl (meth)acrylate, stearyl (meth)acrylate, lauryl (meth)acrylate, octyl (meth)acrylate, decyl (meth) acrylate, isodecyl (meth)acrylate, isomyristyl (meth)acrylate, isostearyl (meth)acrylate, 2-hydroxybutyl (meth)acrylate, butoxyethyl (meth)acrylate, tetrahydrofurfuryl (meth) acrylate, 2-hydroxyethyl (meth)acrylate, or 2-hydroxypropyl (meth)acrylate; or lactone-modified flexible (meth)acrylate. In addition, the saturated aliphatic group-containing monofunction monomer is not regarded as the compound having a cross-linked condensed ring structure.

Among those mentioned above, 3,3,5-trimethylcyclohexyl acrylate (TMCHA), isobornyl acrylate (IBXA), tert-butylcyclohexanol acrylate (TBCHA), or lauryl acrylate (LA) is preferable. Since the saturated aliphatic group-containing monofunction monomer as described above is used, in addition to the tendency to further improve the curing property of the under layer ink and the abrasion resistance of the coating film thereof, the decrease in glossiness of the coating film of the under layer ink tends to be further suppressed.

1.1.1.(2) Composition of Polymerizable Compound

The under layer ink contains, as the polymerizable compound, 80.0 percent by mass or more of the monofunctional polymerizable compound with respect to the total mass of the polymerizable compounds and also contain 55.0 percent by mass or more of the polymerizable compound having a nitrogen heterocyclic structure and/or the polymerizable compound having a hydroxy group in total with respect to the total mass of the polymerizable compounds.

Monofunctional Polymerizable Compound

The monofunctional polymerizable compound is a compound having one polymerizable functional group in its molecule. Although the monofunctional polymerizable compound is not particularly limited, a known monofunction monomer having a polymerizable functional group based on an unsaturated double bond between carbon atoms of a (meth)acrylic group, a vinyl group, or the like may be mentioned. The monofunctional polymerizable compound may be selected from the polymerizable compounds mentioned above by way of example.

As the monofunctional polymerizable compound, a monofunction monomer is preferably used. Since a monofunction monomer having a relatively small molecular weight is used, the viscosity of the under layer ink can be further decreased. As a particular example of the monofunction monomer, for example, there may be mentioned phenoxyethyl (meth)acrylate (PEA), (meth)acryloylmorpholine (ACMO), 4-hydroxybutyl (meth)acrylate (4-HBA), dicyclopentenyl (meth)acrylate (DCPA), isobornyl (meth)acrylate (IBXA), vinyl methyl oxazolidinone (VMOX), 3,3,5-trimethylcyclohexyl (meth)acrylate (TMCHA), lauryl acrylate (LA), or tert-butylcyclohexanol acrylate (TBCHA).

A content of the monofunctional polymerizable compound contained in the under layer ink with respect to the total mass of the polymerizable compounds is 80.0 percent by mass or more. In addition, the content of the monofunctional polymerizable compound contained in the under layer ink with respect to the total mass of the polymerizable compounds is preferably 85.0 percent by mass or more and more preferably 90.0 percent by mass or more. Since the content of the monofunctional polymerizable compound with respect to the total mass of the polymerizable compounds is 80.0 percent by mass or more, the stretching property of the coating film is further improved. In addition, although an upper limit of the monofunctional polymerizable compound in the under layer ink is not particularly limited, the upper limit with respect to the total mass of the polymerizable compounds is preferably 99.0 percent by mass or less, more preferably 98.0 percent by mass or less, and further preferably 97.0 percent by mass or less. Since the content of the monofunctional polymerizable compound with respect to the total mass of the polymerizable compounds is 99.0 percent by mass or less, an odor of the ink is suppressed, the glossiness is further improved, and the curing property and the abrasion resistance of the coating film tend to be further improved.

In addition, the content of the monofunctional polymerizable compound contained in the under layer ink with respect to the total mass of the entire under layer ink is preferably 70.0 percent by mass or more, more preferably 75.0 percent by mass or more, and further preferably 80.0 percent by mass or more. Since the content of the monofunctional polymerizable compound with respect to the total mass of the under layer ink is 70.0 percent by mass or more, the stretching property of the coating film tends to be further improved. In addition, an upper limit of the monofunctional polymerizable compound with respect to the total mass of the under layer ink is preferably 95.0 percent by mass or less, more preferably 92.0 percent by mass or less, and further preferably 90.0 percent by mass or less. Since the content of the monofunctional polymerizable compound with respect to the total mass of the under layer ink is 95.0 percent by mass or less, the odor of the ink is suppressed, the glossiness is further improved, and the curing property and the abrasion resistance of the coating film tend to be further improved.

Polymerizable Compound Having Nitrogen Heterocyclic Structure and/or Polymerizable Compound Having Hydroxy Group Although the polymerizable compound having a nitrogen heterocyclic structure is not particularly limited, for example, there may be mentioned a known (meth)acrylate or vinyl compound having a skeleton derived from a nitrogen heterocyclic ring, such as pyrrolidone, piperidine, pyridine, pyrimidine, imidazole, oxazoline, oxazolidine, oxazole, morpholine, or oxazine. The polymerizable compound having a nitrogen heterocyclic structure may be selected from the polymerizable compounds mentioned above by way of example. As a particular example of the polymerizable compound having a nitrogen heterocyclic structure, for example, (meth)acryloylmorpholine (ACMO) or vinyl methyl oxazolidinone (VMOX) may be mentioned.

Although the polymerizable compound having a hydroxy group is not particularly limited, for example, a known (meth)acrylate or vinyl compound having a hydroxy group may be mentioned. The polymerizable compound having a hydroxy group may be selected from the polymerizable compounds mentioned above by way of example. As a particular example of the polymerizable compound having a hydroxy group, for example, 2-hydroxyethyl (meth)acrylate, 2-hydroxypropyl (meth)acrylate, 2-hydroxy-3-phenoxypropyl (meth)acrylate, 4-hydroxybutyl (meth)acrylate (4-HBA), or hydroxypivalic acid neopentyl glycol di(meth)acrylate may be mentioned.

The under layer ink of this embodiment contains at least one of the polymerizable compound having a nitrogen heterocyclic structure and the polymerizable compound having a hydroxy group. In addition, the under layer ink contains 55.0 percent by mass or more of the polymerizable compound having a nitrogen heterocyclic structure and/or the polymerizable compound having a hydroxy group in total with respect to the total mass of the polymerizable compounds.

In addition, the total content of the polymerizable compound having a nitrogen heterocyclic structure and/or the polymerizable compound having a hydroxy group contained in the under layer ink with respect to the total mass of the polymerizable compounds is preferably 60.0 percent by mass or more and more preferably 65.0 percent by mass or more.

In addition, the polymerizable compound having a nitrogen heterocyclic structure and the polymerizable compound having a hydroxy group each may be included in the monofunctional polymerizable compound described above in some cases. Hence, as for the under layer ink, when the content of the monofunction monomer with respect to the total mass of the polymerizable compounds being 80.0 percent by mass or more and the content of the polymerizable compound having a nitrogen heterocyclic structure and/or the polymerizable compound having a hydroxy group with respect to the total mass of the polymerizable compounds being 55.0 percent by mass or more are calculated, the contents thereof are each independently calculated, and a content of a specific monomer may be duplicately included in groups to which the specific monomer belongs in some cases.

Since the content of the polymerizable compound having a nitrogen heterocyclic structure and/or the polymerizable compound having a hydroxy group is 55.0 percent by mass or more with respect to the total mass of the polymerizable compounds, the adhesion of the over layer ink to the coating film can be further improved. In addition, although an upper limit of the content of the polymerizable compound having a nitrogen heterocyclic structure and/or the polymerizable compound having a hydroxy group in the under layer ink is not particularly limited, the upper limit with respect to the total mass of the polymerizable compounds is preferably 90.0 percent by mass or less and more preferably 85.0 percent by mass or less.

1.1.2. Polymerization Initiator

The under layer ink may contain a polymerization initiator. Although the polymerization initiator is not particularly limited as long as generating active species when irradiated with radioactive rays, for example, a known polymerization initiator, such as an acylphosphine oxide-based polymerization initiator, an alkylphenone-based polymerization initiator, a titanocene-based polymerization initiator, or a thioxanthone-based polymerization initiator, may be mentioned. Among those mentioned above, an acylphosphine oxide-based polymerization initiator is preferable. Since the polymerization initiator as described above is used, the curing property of the under layer ink is further improved, and in particular, the curing property thereof in a curing process by UV-LED light tends to be further improved. The polymerization initiator may be used alone, or at least two types thereof may be used in combination.

Although the acylphosphine oxide-based polymerization initiator is not particularly limited, for example, 2,4,6-trimethylbenzoyl diphenylphosphine oxide, bis(2,4,6-trimethylbenzoyl)-phenylphosphine oxide, or bis(2,6-dimethoxybenzoyl)-2,4,4-trimethypentylphosphine oxide may be mentioned.

As a commercially available product of the acylphosphine oxide-based polymerization initiator as described above, for example, there may be mentioned IRGACURE 819 (bis(2,4,6-trimethylbenzoyl)-phenylphosphine oxide), IRGACURE 1800 (mixture of bis(2,6-dimethoxybenzoyl)-2,4,4-trimethylpentylphosphine oxide and 1-hydroxy-cyclohexyl-phenylketone at a mass ratio of 25:75) or), or IRGACURE TPO (2,4,6-trimethylbenzoyl)-diphenylphosphine oxide) (each manufactured by BASF).

A content of the polymerization initiator contained in the under layer ink with respect to the total mass of the under layer ink is preferably 3.0 to 12.0 percent by mass, more preferably 5.0 to 10.0 percent by mass, and further preferably 7.0 to 9.0 percent by mass. Since the content of the polymerization initiator is in the range described above, the curing property of the under layer ink and the solubility of the polymerization initiator tend to be further improved.

1.1.3. Colorant

The under layer ink may or may not contain a colorant. As the colorant, at least one of a pigment and a dye may be used.

When the pigment is used as the colorant, a light resistance of the under layer ink may be improved. As the pigment, either an inorganic pigment or an organic pigment may be used. The pigment may be used alone, or at least two types thereof may be used in combination.

As the inorganic pigment, for example, a carbon black (C.I. (Colour Index Generic Name) Pigment Black 7), such as a furnace black, a lamp black, an acetylene black, a channel black, an iron oxide, or a titanium oxide may be used.

As the organic pigment, for example, there may be mentioned an azo pigment, such as an insoluble azo pigment, a condensed azo pigment, an azo lake, or a chelate azo pigment; a polycyclic pigment, such as a phthalocyanine pigment, a perylene and perinone pigment, an anthraquinone pigment, a quinacridone pigment, a dioxane pigment, a thioindigo pigment, an isoindolinone pigment, or a quinophthalone pigment; a dye chelate (such as a basic dye type chelate or an acidic dye type chelate), a dye lake (such as a basic dye type lake or an acidic dye type lake), a nitro pigment, a nitroso pigment, an aniline black, or a daylight fluorescent pigment.

In more particular, as a carbon black to be used for black, for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven 5750, Raven 5250, Raven 5000, Raven 3500, Raven 1255, or Raven 700 (manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, or Monarch 1400 (manufactured by CABOT JAPAN K. K.); or Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, or Special Black 4 (manufactured by Degussa).

As a white pigment to be used for white, C.I. Pigment White 6, 18, Or 21 may be mentioned.

As a pigment to be used for yellow, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, or 180.

As a pigment to be used for magenta, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245; or C.I. Pigment Violet 19, 23, 32, 33, 36, 38, 43, or 50.

As a pigment to be used for cyan, for example, there may be mentioned C.I. Pigment blue 1, 2, 3, 15, 15:1, 15:2, 15:3, 15:34, 15:4, 16, 18, 22, 25, 60, 65, or 66; or C.I. Pigment Vat Blue 4 or 60.

As a pigment to be used for other than magenta, cyan, and yellow, for example, there may be mentioned C.I. Pigment Green 7 or 10; C.I. Pigment Brown 3, 5, 25, or 26; C.I. Pigment Orange 1, 2, 5, 7, 13, 14, 15, 16, 24, 34, 36, 38, 40, 43, or 63.

As the colorant, the dye may also be used. The dye is not particularly limited, and for example, an acidic dye, a direct dye, a reactive dye, or a basic dye may be used. The dye may be used alone, or at least two types thereof may be used in combination.

Although the dye is not particularly limited, for example, there may be mentioned C.I. Acid Yellow 17, 23, 42, 44, 79, or 142; C.I. Acid Red 52, 80, 82, 249, 254, or 289; C.I. Acid Blue 9, 45, or 249; C.I. Acid Black 1, 2, 24, or 94; C.I. Food Black 1 or 2; C.I. Direct Yellow 1, 12, 24, 33, 50, 55, 58, 86, 132, 142, 144, or 173; C.I. Direct Red 1, 4, 9, 80, 81, 225, or 227; C.I. Direct Blue 1, 2, 15, 71, 86, 87, 98, 165, 199, or 202; C.I. Direct Black 19, 38, 51, 71, 154, 168, 171, or 195; C.I. Reactive Red 14, 32, 55, 79, or 249; or C.I. Reactive Black 3, 4, or 35.

Among those mentioned above, as the colorant, a white pigment is preferably contained. When the under layer ink contains a white pigment, an ink set capable of forming an image having a preferable visibility and a more preferable background shielding property can be obtained.

When a white pigment is not contained as the colorant, a total content of the colorant of the under layer ink with respect to the total mass of the under layer ink is preferably 0.2 to 20.0 percent by mass, more preferably 0.5 to 15.0 percent by mass, and further preferably 1.0 to 10.0 percent by mass. On the other hand, when a white pigment is contained as the colorant, the total content of the colorant with respect to the total mass of under layer ink is preferably 5.0 to 25.0 percent by mass and more preferably 10.0 to 20.0 percent by mass. Since the content of the white pigment is in the range described above, the background shielding property of the under layer ink is further improved.

1.1.4. Other Additives

The under layer ink may further contain, if needed, additives, such as a dispersant, a polymerization inhibitor, and a slipping agent.

Dispersant

Although the dispersant is not particularly limited, for example, a dispersant, such as a high molecular weight dispersant, which is currently used to prepare a pigment dispersion liquid may be mentioned. As a particular example thereof, for example, a compound which contains, as a primary component, at least one selected from a polyoxyalkylene polyalkylene polyamine, a vinyl-based polymer or copolymer, an acrylic-based polymer or copolymer, a polyester, a polyamide, a polyimide, a polyurethane, an amino-based polymer, a silicon-containing polymer, a sulfur-containing polymer, a fluorine-containing polymer, and an epoxy resin. The dispersant may be used alone, or at least two types thereof may be used in combination.

As a commercially available product of the high molecular weight dispersant, for example, there may be mentioned AJISUPER series manufactured by Ajinomoto Fine-Techno Co., Inc.; Solsperse series (such as Solsperse36000) available from Avecia or Noveon; Disper BYK series manufactured by BYK Additives & Instruments; or Disparlon series manufactured by Kusumoto Chemicals, Ltd.

A content of the dispersant contained in the under layer ink with respect to the total mass of the under layer ink is preferably 0.1 to 2.0 percent by mass, more preferably 0.1 to 1.0 percent by mass, and further preferably 0.1 to 0.5 percent by mass.

Polymerization Inhibitor

The under layer ink may further contain a polymerization inhibitor. The polymerization inhibitor may be used alone, or at least two types thereof may be used in combination.

Although the polymerization inhibitor is not particularly limited, for example, there may be mentioned p-methoxyphenol, hydroxymonomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), or a hindered amine compound.

A content of the polymerization inhibitor with respect to the total mass of the under layer ink is preferably 0.05 to 1.0 percent by mass and more preferably 0.05 to 0.5 percent by mass.

Slipping Agent

The under layer ink may further contain a slipping agent. The slipping agent may be used alone, or at least two types thereof may be used in combination.

As the slipping agent, a silicone-based surfactant is preferable, and a polyester-modified silicone or a polyether-modified silicone is more preferable. As the polyester-modified silicone, for example, BYK-347, 348, 350, BYK-UV3500, 3510, or 3530 (manufactured by BYK Additives & Instruments) may be mentioned, and as the polyether-modified silicone, for example, BYk-3570 (manufactured by BYK Additives & Instruments) may be mentioned.

A content of the slipping agent with respect to the total mass of the under layer ink is preferably 0.01 to 2.0 percent by mass and more preferably 0.05 to 1.0 percent by mass.

1.2. Over Layer Ink

The over layer ink is a radiation curable ink jet composition. The over layer ink contains at least one polymerizable compound. In addition, the over layer ink may contain, if needed, a polymerization initiator, a colorant, and other additives.

The polymerizable compound, the polymerization initiator, the colorant, and the other additives to be usable for the over layer ink are respectively similar to those described in "1.1.1. (1) polymerizable compound", "1.1.2. polymerization initiator", "1.1.3. colorant", and "1.1.4. other additives" of "1.1. under layer ink" described above. When the "over layer ink" is used instead of using the "under layer ink" in each of the items described above, all the descriptions may also be applied to the over layer ink, and hence duplicated descriptions will be omitted.

1.2.1. Composition of Polymerizable Compound

The over layer ink contains, as the polymerizable compound, a monofunctional polymerizable compound in an amount of preferably 95.0 percent by mass or more and more preferably 98.0 percent by mass or more with respect to the total mass of the polymerizable compounds. When the content of the monofunctional polymerizable compound is in this range, cracks of an image to be formed by the over layer ink is further suppressed from being generated. That is, accordingly, since the flexibility of a cured film to be formed by the over layer ink is further increased, when the cured film formed by the over layer ink is distorted by stretching and/or bending of a recording medium, the cured film is likely to be deformed so as to follow the distortion. Hence, cracks are not likely to be generated, and as a result, the image is likely to be maintained under preferable conditions.

In addition, the over layer ink contains, as the polymerizable compound, a polymerizable compound which satisfies the following condition A and condition B in an amount of 80.0 percent by mass or more, preferably 85.0 percent by mass or more, and more preferably 90.0 percent by mass or more with respect to the total mass of the polymerizable compounds.

Condition A: a volume defined by the van der Waals radii is 0.26 $nm^3$ or more.

Condition B: a height direction area with respect to a long side is 0.25 $nm^2$ or more.

Since the over layer ink contains a large amount of the bulky polymerizable compound as defined by the conditions A and B, glossiness of the image formed by the over layer ink is improved.

The volume defined by the van der Waals radii of the condition A is preferably 0.27 $nm^3$ or more and more preferably 0.28 $nm^3$ or more. In addition, although an upper limit of the volume defined by the van der Waals radii is not particularly limited, for example, the upper limit thereof is preferably 0.60 $nm^3$ or less, more preferably 0.55 $nm^3$ or less, and further preferably 0.50 $nm^3$ or less.

The height direction area with respect to the long side defined by the van der Waals radii of the condition B is preferably 0.27 $nm^2$ or more and more preferably 0.29 $nm^2$ or more. In addition, although an upper limit of the height direction area with respect to the long side defined by the van der Waals radii is not particularly limited, for example, the upper limit thereof is preferably 0.50 $nm^2$ or less, more preferably 0.45 $nm^2$ or less, and further preferably 0.40 $nm^2$ or less.

In addition, the volume and the height direction area with respect to the long side defined by the van der Waals radii are obtained as the volume and the height direction area with respect to the long side, respectively, in a molecular structure having the lowest energy among structural isomers of the molecule. In order to identify the steric structure of the molecule defined by the van der Waals radii, and in order to calculate the volume and the height direction area with respect to the long side based on the identification described above, for example, known software, such as thermodynamic property prediction software, may be used.

The "volume" indicates the volume of a cavity formed from the van der Waals radii obtained by approximating a molecular state in vacuum from its chemical formula. In addition, the "long side" is the longest side of the steric shape defined by the van der Waals radii, and when the structure in which the molecule is most stabilized is modeled, the largest distance between terminal atoms (such as C, O, and N) of the skeleton is obtained by calculation. The "height direction area with respect to the long side" is a value obtained by dividing the volume by the long side and indicates an index of the area of the plane orthogonal to the long side.

As the polymerizable compound which satisfies the above conditions, for example, there may be mentioned a monofunction monomer, such as dicyclopentenyl acrylate (DCPA), isobornyl acrylate (IBXA), 3,3,5-trimethylcyclohexyl acrylate (TMCHA), tert-butylcyclohexanol acrylate (TBCHA), isononyl acrylate (INAA), or lauryl acrylate (LA), having one polymerizable functional group; or a polyfunction monomer, such as dipropyl glycol diacrylate (DPGDA), having a plurality of polymerizable functional groups.

1.2.2. Colorant

The over layer ink may or may not contain a colorant. When the colorant is contained, the over layer ink functions as a color ink to form an image. On the other hand, when the colorant is not contained, the over layer ink functions as a clear ink to protect an image recorded by the under layer ink.

The over layer ink preferably contains a non-white pigment. In particular, when the under layer ink contains a white pigment, if the over layer ink is a color ink containing a non-white pigment, an image using the coating film formed by the under layer ink as a base layer is formed, and hence, the visibility of the image can be improved. In addition, when the under layer is white, in an image formed thereon by the over layer ink, granular feeling is liable to be enhanced; however, according to the ink set of this embodiment, since the over layer ink described above has a preferable wet spreadability, the granular feeling is suppressed from being generated. That is, since the over layer ink contains a non-white pigment, the effect obtained due to the preferable wet spreadability of the over layer ink becomes more significant.

1.3. Relationship Between Polymerizable Compounds

In the ink set of this embodiment, the content of the monofunctional polymerizable compound of the over layer ink is more preferably set larger than the content of the monofunctional polymerizable compound of the under layer ink. Accordingly, since a content ratio of the monofunctional polymerizable compound of the under layer ink is smaller than a content ratio of the monofunctional polymerizable compound of the over layer ink, the over layer ink is likely to spread as compared to the under layer ink, and when a recording medium is bent or stretched at an image forming portion, cracks in the image formed by the over layer ink are further not likely to be generated.

1.4. Relationship Between Surface Tensions

In the ink set of this embodiment, a surface tension of the under layer ink is preferably set higher than a surface tension of the over layer ink. Accordingly, the wet spreadability of the over layer ink may be further improved.

In addition, in the ink set of this embodiment, the surface tension of the under layer ink is preferably set higher than the surface tension of the over layer ink by 8.0 mN/m or more. Accordingly, the wet spreadability of the over layer ink may be further improved.

In this specification, the "ink wet spreadability" indicates a property in which when the over layer ink is linearly overcoated on the coating film of the under layer ink, the line width thereof is relatively increased. The "curing" indicates that when an ink containing a polymerizable compound is irradiated with radioactive rays, the polymerizable compound is polymerized, and the ink is solidified. The "curing property" indicates a property of a material which is to be cured when sensing light. "Burying property" is also called a filling property and indicates a property in which when a recorded matter is observed from a side at which a cured product (image) is formed, a recording medium functioning as a base layer is not viewed. "Ejection stability" indicates a property in which liquid droplets are ejected without nozzle clogging. "Storage stability" indicates a property in which when an ink is stored, the viscosity thereof is not likely to be changed before and after the storage.

1.5. Another Ink Composition

As long as containing the under layer ink and the over layer ink compositions, the ink set of this embodiment may further contains at least one ink composition other than those mentioned above.

1.6. Operational Effect

According to the ink set of this embodiment, since the under layer ink contains a large amount of the monofunctional polymerizable compound, the flexibility of the coating film is preferable, and the adhesion of an image to be formed to a recording medium is also preferable. In addition, since the under layer ink contains the polymerizable compound having a polar group, the wet spreadability of the over layer ink on the coating film is preferable, and an image having a preferable burying property can be formed. When the under layer ink contains a large amount of the monofunctional polymerizable compound, even if the surface tension of the over layer ink is simply made different from the surface tension of the under layer ink, the wet spreadability of the over layer ink cannot be secured. However, according to this ink set, since the under layer ink contains the polymerizable compound having a nitrogen heterocyclic structure and/or the polymerizable compound having a hydroxy group, each of which has a polar portion in its molecule, the portion described above appears to the surface of the cured coating film of the under layer ink when being cured, and the surface free energy of the under layer ink is improved thereby, so that the wet spreadability of the over layer ink is improved.

2. Ink Jet Recording Method

An ink jet recording method according to this embodiment is an ink jet recording method using the ink set described above and includes a first adhesion step of adhering the under layer ink to a recording medium, a first curing step of forming an under layer cured film by irradiating the under layer ink on the recording medium with radioactive rays, a second adhesion step of adhering the over layer ink to the under layer cured film, and a second curing step of forming an over layer cured film by irradiating the over layer ink on the under layer cured film with radioactive rays.

2.1. Recording Medium

Since the ink set of this embodiment is, for example, ejected on a recording medium by an ink jet recording method, a recorded matter is obtained. As this recording medium, for example, an absorbing or non-absorbing recording medium may be mentioned. The ink jet recording method of this embodiment which will be described later may be widely used for many recording media having various absorbing performances from a non-absorbing recording medium into which an ink hardly permeates to an absorbing recording medium into which an ink easily permeates.

Although the absorbing recording medium is not particularly limited, for example, there may be mentioned various types of recording media from regular paper, such as electron photo paper having a high ink permeability or ink jet paper (ink jet exclusive paper including an ink absorbing layer formed from silica particles or alumina particles or an ink absorbing layer formed from a hydrophilic polymer, such as a poly(vinyl alcohol) (PVA) or a poly(vinyl pyrrolidone) (PVP)), to art paper, coated paper, or cast paper each of which has a relatively low ink permeability and is used for general offset printing.

Although the non-absorbing recording medium is not particularly limited, for example, a film, a sheet, or a plate formed of a plastic, such as a poly(vinyl chloride) (PVC), a polyethylene, a polypropylene, or a poly(ethylene terephthalate) (PET); a plate formed of a metal, such as iron, silver, copper, or aluminum; a metal plate or a plastic film formed by vapor deposition of at least one of the metals mentioned above; or a plate formed of an alloy, such as stainless steel or brass, may be mentioned.

2.2. Ink Jet Recording Apparatus

One example of an ink jet recording apparatus (hereinafter, simply referred to as "recording apparatus" in some cases) which performs the ink jet recording method described above using the ink set of this embodiment will be described. This recording apparatus include a first recording mode, a second recording mode, and a recording control portion.

The first recording mode is to form a coating film by overcoating the over layer ink on the coating film formed of the under layer ink.

The second recording mode is to form a coating film by overcoating the under layer ink on the coating film formed of the over layer ink.

The recording control portion is to control an ink amount per dot of a solid pattern image formed by the under layer ink in the first recording mode and the second recording mode.

Hereinafter, one example of the above recording apparatus will be described in detail.

FIGURE is a schematic view illustrating one example of a head unit and a transport unit of a recording apparatus which is usable in this embodiment. A continuous sheet-shaped recording medium S is transported from upstream to downstream in a transport direction in association with the rotation of an upstream roller 12A, a transport drum 12, and a downstream roller 12B. The head unit includes a first white head unit 30A (located at a left side of the plane in FIGURE) to eject a white ink W, a yellow head unit 30B to eject a yellow ink Y, a magenta head unit 30C to eject a magenta ink M, a cyan head unit 30D to eject a cyan ink C, a black head unit 30E to eject a black ink K, and a second white head unit 30A (located at a right side of the plane in FIGURE) to eject the white ink W. A radiation unit 40 includes radiation portions 42a, 41a, 41b, 41c, 41d, and 42b provided at downstream of the respective head units in the transport direction and a radiation portion 43 provided last in the transport direction. The recording apparatus as described above may be formed as shown in FIG. 2 of JP-A-2010-208218.

In addition, when the first recording mode is performed, to the recording medium S to be sequentially transported to a position which faces each head unit on the transport drum, the under layer ink is first ejected from the first white head unit 30A, and radiation is then performed by the radiation portion 42a, so that a coating film of the under layer ink is formed. Next, on the coating film thus formed, the over layer ink is ejected from at least one of the yellow head unit 30B, the magenta head unit 30C, the cyan head unit 30D, and the black head unit 30E, and radiation is then performed from the radiation portion provided downstream of the corresponding head. Finally, radiation is performed by the radiation portion 43, so that a coating film is formed. In addition, the second white head unit 30A and the radiation portion 42b are not used.

In addition, when the second recording mode is performed, to the recording medium S to be sequentially transported to a position which faces each head unit on the transport drum, the over layer ink is first ejected from at least one of the yellow head unit 30B, the magenta head unit 30C, the cyan head unit 30D, and the black head unit 30E, and radiation is then performed by the radiation portion provided downstream of the corresponding head, so that a coating film of the over layer ink is formed. Next, on the coating film thus formed, the under layer ink is ejected from the second white head unit 30A, and radiation is then performed by the radiation portion 42b. Finally, radiation is performed by the radiation portion 43, so that a coating film is formed. In addition, the first white head unit 30A and the radiation portion 42 are not used.

When the coating film of the under layer ink is formed to have a solid pattern, the recording control portion described above may adjust such that an ink amount of the under layer ink per one dot of the second recording mode is set larger than that of the first recording mode preferably by 10% or more and more preferably by 10% to 50%. Accordingly, even in the second recording mode, the wet spreadability of the under layer ink can be secured so as to be equivalent to that in the first recording mode. In addition, the one dot indicates ink droplets to be adhered to one pixel which is the minimum recording unit defined by the recording resolution.

In addition, the second recording mode is not always required to be provided, and in this case, the second white head unit 30A and the radiation portion 42b may not be provided. In addition, an ink to form the coating film later among the inks, that is, the over layer ink in the first recording mode and the under layer ink in the second recording mode, may be cured by the radiation performed by at least one of the radiation portions (41a to 41d, and 42b) provided at downstream of the respective head units and the radiation portion 43, and when the ink described above is cured by the radiation portion provided downstream of the head unit, the radiation portion 43 may not be provided.

In addition, the "solid pattern image" in this specification indicates an image in which dots are recorded on all the pixels each of which is the minimum recording unit region defined by the recording resolution.

2.3. Ink Jet Recording Method

In this embodiment, the under layer ink is an ink to form the coating film on the recording medium in the first recording mode before the over layer ink is coated, and the over layer ink is an ink to form the coating film on the coating film of the under layer ink provided on the recording medium in the first recording mode. For example, one of the over layer ink and the under layer ink may be regarded as a primary ink, and the other ink may be regarded as an auxiliary ink. In addition, the primary ink may be used as an ink, such as a color ink, to form a coating film to be viewed. In addition, for example, the auxiliary ink may be regarded as a specific ink, such as a white ink, an under layer ink, or a metallic ink, or may be regarded as a functional ink which improves the performances, such as the adhesion, the wet spreadability, and the abrasion resistance, of the primary ink.

In addition, although the over layer ink and the under layer ink each may be regarded as the primary ink or the auxiliary ink, when one of the inks is used as the primary ink, and the other ink is used as the auxiliary ink, applications of the recorded matter is preferably increased, and the performance of the primary ink is also preferably improved. In addition, when one of the inks is regarded as the primary ink, and the other ink is regarded as the auxiliary ink, whether the over layer ink or the under layer ink is used as the primary ink may be determined in consideration of the characteristics of each of the primary ink and the auxiliary ink described above. Hence, in the above FIGURE, although the head to eject the under layer ink in the first recording mode is regarded as the first white head unit 30A, the under layer ink is not limited to a white ink.

As described above, the reason the ink amount of the first recording mode is made different from that of the second recording mode is that in the second recording mode, since the line width of the under layer ink on the coating film of the over layer ink is decreased, the burying property of the solid pattern image of the under layer ink is degraded. Hence, when the ink amount is increased as described above, the burying property of the under layer ink can be improved.

The ink jet recording method of this embodiment includes a first recording step of forming the coating film of the under layer ink of this embodiment on a recording medium, and a second recording step in which the over layer ink of this embodiment is overcoated on the above coating film to form the coating film of the ink described above, that is, to form an image.

The first recording step and the second recording step each include a first (second) ejection step of ejecting the ink to the recording medium and a first (second) curing step of curing the ink by irradiating the ink thus ejected with radioactive rays. As described above, by the ink cured on the recording medium, the image, that is, the cured ink coating film, is formed. Hereinafter, those steps will be described.

Ejection Step

In the first ejection step, the ink is ejected to a recording medium, and the under layer ink is adhered thereto. In addition, in the second ejection step, the over layer ink is adhered to the under layer cured film. The viscosity of the ink in the ejection is preferably 15 mPa·s or less and more preferably 12 mPa·s or less. If the viscosity of the ink as described above is measured when the ink is at room temperature or is not heated, the ink may be ejected under the condition described above. In this case, the temperature of the ink in the ejection is preferably 20° C. to 30° C. In addition, after being heated to a predetermined temperature so as to have a preferable viscosity, the ink may be ejected. Accordingly, a preferable ejection stability may be realized.

The under layer ink and the over layer ink according to this embodiment are each a radiation curable ink, and since the viscosity thereof is higher than that of a general aqueous ink, the change in viscosity caused by the change in temperature in the ejection is large. The change in viscosity as described above has a serious influence on the change in liquid droplet size and the change in liquid droplet ejection rate, and as a result, degradation in image quality may occur in some cases. Hence, the temperature of the ink in the ejection is preferably maintained constant as much as possible.

Curing Step

Next, in the curing step, the ink ejected and then adhered (landed) to the recording medium is cured by being irradiated with radioactive rays. In the curing step, a first curing step in which the under layer coating film is formed by irradiating the under layer ink adhered to the recording medium in the first ejection step described above with radioactive rays and a second curing step in which the over layer coating film is formed by irradiating the over layer ink adhered to the under layer cured film in the second ejection step described above with radioactive rays are included. In the curing steps described above, since the polymerization initiator contained in the ink is decomposed when being irradiated with light (ultraviolet rays), initiating species, such as radicals, acids, or bases, are generated, and by the function of the initiating species, a polymerization reaction of the polymerizable compound is promoted. Alternatively, the polymerization reaction of the polymerizable compound is initiated by radiation of the radioactive rays. In the case described above, if a sensitizing dye is present together with the polymerization initiator in the ink, the dye in the system is placed in an excited state by absorption of radioactive rays and promotes decomposition of the polymerization initiator when being brought into contact therewith, so that a more highly sensitive curing reaction can be performed.

As a radiation source, for example, a mercury lamp to radiate ultraviolet rays or a gas/solid laser has been mainly used, and as a light source to be used for curing of a radiation curable ink jet ink, a mercury lamp or a metal halide lamp has been widely known. On the other hand, in view of current environmental protection, a mercury free device has been desired, and replacement by a GaN-based semiconductor ultraviolet light emitting device is significantly effective from industrial and environmental points of view. Furthermore, since being compact and low cost and having a long life and a high efficiency, an ultraviolet light emitting diode (UV-LED) and an ultraviolet laser diode (UV-LD) are each preferably used as a radiation curable ink jet light source. Among those mentioned above, an UV-LED is preferable.

In addition, since an output of the LED is likely to be increased, by using an UV-LED having a light emission peak wavelength in a range of 350 to 420 nm, a set of radiation curable ink jet inks curable at a radiation energy of 200 mJ/cm$^2$ or less is preferably used for the ink jet recording method. In this case, a low-cost printing and a high printing rate can be realized. The ink as described above can be obtained when at least one of a polymerization initiator to be decomposed by ultraviolet radiation in the wavelength range described above and a polymerizable compound which starts the polymerization by ultraviolet radiation in the wavelength range described above is contained.

As described above, according to this embodiment, an ink jet recording method using the ink set in which the wet spreadability of the over layer ink, the curing property and the ejection stability of each of the over layer ink and the under layer ink, and the burying property of the under layer ink on the recording medium are all excellent can be provided.

According to this ink jet recording method, since the under layer ink contains a large amount of the monofunctional polymerizable compound, the flexibility of the coating film is preferable, and the adhesion of an image to be formed to the recording medium is also preferable. In addition, since the under layer ink contains the polymerizable compound having a polar group, the wet spreadability of the over layer ink is also preferable on the coating film, and an image having a preferable burying property can be formed.

3. Examples and Comparative Examples

Hereinafter, although the present disclosure will be described in more detail with reference to Examples and Comparative Examples, the present disclosure is not limited to the following Examples.

3.1. Preparation of Under Layer Ink and Over Layer Ink

First, after a colorant, a dispersant, and some parts of monomers of one of compositions shown in Tables 1 and 2 were weighed and charged in a pigment dispersion tank, ceramic-made beads having a diameter of 1 mm were changed in the tank, and the mixture thus prepared was stirred, so that a pigment dispersion liquid in which the colorant was dispersed in the monomers was obtained. Next, in order to obtain the above composition shown in Table 1 or 2, after the remaining monomers, a polymerization initiator, and a polymerization inhibitor were charged in a mixture tank which was a stainless steel-made container and were then mixed together by stirring so as to be fully dissolved, the pigment dispersion liquid obtained as described above was charged and was further mixed together by stirring at ordinary temperature for 1 hour. Subsequently, filtration was performed using a 5-μm membrane filter, so that one of an under layer ink and an over layer ink was obtained. In addition, the numerical value of each component in the Tables represents percent by mass unless otherwise particularly noted.

TABLE 1

| | | | UNDER LAYER INK | | | | | | | |
|---|---|---|---|---|---|---|---|---|---|---|
| | | | L1 | L2 | L3 | L4 | L5 | L6 | L7 | L8 |
| POLYMERIZABLE COMPOUND | MONOFUNCTION | PEA | 18.0 | 18.0 | 18.0 | 18.0 | 18.0 | 36.0 | 28.0 | 18.0 |
| | | ACMO (O) | 43.0 | — | 28.0 | 52.0 | 43.0 | 20.0 | 10.0 | 10.0 |
| | | 4-HBA (O) | — | — | 15.0 | — | — | — | — | — |
| | | DCPA | — | — | — | — | — | 10.0 | — | — |
| | | IBXA | — | — | — | — | — | 4.0 | 10.0 | — |
| | | VMOX (O) | — | 43.0 | — | — | — | — | — | — |
| | POLYFUNCTION | VEEA | 12.0 | 12.0 | 12.0 | 3.0 | — | 3.0 | 25.0 | 30.0 |
| | | DPGDA | — | — | — | — | 12.0 | — | — | 15.0 |
| POLYMERIZATION INITIATOR | | 819 | 2.5 | 2.5 | 2.5 | 2.5 | 2.5 | 2.5 | 2.5 | 2.5 |
| | | TPO | 5.5 | 5.5 | 5.5 | 5.5 | 5.5 | 5.5 | 5.5 | 5.5 |
| POLYMERIZATION INHIBITOR | | MEHQ | 0.3 | 0.3 | 0.3 | 0.3 | 0.3 | 0.3 | 0.3 | 0.3 |
| SLIPPING AGENT | | BYK 350 | 0.5 | 0.5 | 0.5 | 0.5 | 0.5 | 0.5 | 0.5 | 0.5 |
| COLORANT | | PW6 | 18.0 | 18.0 | 18.0 | 18.0 | 18.0 | 18.0 | 18.0 | 18.0 |
| DISPERSANT | | solsperse36000 | 0.2 | 0.2 | 0.2 | 0.2 | 0.2 | 0.2 | 0.2 | 0.2 |
| TOTAL MASS | | | 100 | 100 | 100 | 100 | 100 | 100 | 100 | 100 |
| RATE OF MONOFUNCTIONAL POLYMERIZABLE COMPOUND IN POLYMERIZABLE COMPOUNDS | | | 83.6 | 83.6 | 83.6 | 95.9 | 83.6 | 95.9 | 65.8 | 38.4 |
| RATE OF POLYMERIZABLE COMPOUND (O) IN POLYMERIZABLE COMPOUNDS | | | 58.9 | 58.9 | 58.9 | 71.2 | 58.9 | 27.4 | 13.7 | 13.7 |
| SURFACE TENSION OF INK | | | 34.0 | 34.0 | 34.0 | 34.0 | 34.0 | 34.0 | 33.0 | 33.0 |

TABLE 2

| | | | VOLUME ($nm^3$) | LONG SIDE (nm) | VOLUME/LONG SIDE ($nm^2$) | OVER LAYER INK | | | |
|---|---|---|---|---|---|---|---|---|---|
| | | | | | | U1 | U2 | U3 | U4 |
| POLYMERIZABLE COMPOUND | MONOFUNCTION | PEA | 0.24 | 1.10 | 0.22 | 38.0 | 40.0 | 5.0 | 40.5 |
| | | TMCHA (Δ) | 0.29 | 0.80 | 0.37 | — | — | — | — |
| | | ACMO | 0.18 | 0.59 | 0.30 | 12.0 | — | — | — |
| | | LA (Δ) | 0.35 | 1.38 | 0.26 | — | — | 20.0 | — |
| | | DCPA (Δ) | 0.26 | 0.90 | 0.29 | 10.0 | — | — | — |
| | | IBXA (Δ) | 0.28 | 0.80 | 0.35 | — | — | 33.0 | — |
| | | TBCHA (Δ) | 0.29 | 1.02 | 0.28 | 24.0 | — | 26.0 | — |
| | POLYFUNCTION | VEEA | 0.24 | 0.74 | 0.33 | 3.0 | 22.0 | 3.0 | 22.0 |
| | | DPGDA (Δ) | 0.31 | 0.82 | 0.38 | — | 25.0 | — | 25.0 |
| POLYMERIZATION INITIATOR | | 819 | | | | 2.5 | 2.5 | 2.5 | 2.5 |
| | | TPO | | | | 5.5 | 5.5 | 5.5 | 5.5 |
| POLYMERIZATION INHIBITOR | | MEHQ | | | | 0.3 | 0.3 | 0.3 | 0.3 |
| SLIPPING AGENT | | BYK UV3500 | | | | 0.5 | 0.5 | 0.5 | — |
| COLORANT | | PB15:3 | | | | 4.0 | 4.0 | 4.0 | 4.0 |
| DISPERSANT | | solsperse36000 | | | | 0.2 | 0.2 | 0.2 | 0.2 |
| TOTAL MASS | | | | | | 100 | 100 | 100 | 100 |
| RATE OF MONOFUNCTIONAL POLYMERIZABLE COMPOUND IN POLYMERIZABLE COMPOUNDS | | | | | | 96.6 | 46.0 | 96.6 | 46.3 |
| RATE OF POLYMERIZABLE COMPOUND (Δ) IN POLYMERIZABLE COMPOUNDS | | | | | | 41.4 | 28.7 | 90.8 | 28.6 |
| SURFACE TENSION OF INK | | | | | | 24.0 | 23.0 | 22.0 | 36.0 |

The abbreviations in Tables 1 and 2 are as described below.

PEA: trade name "Viscoat #192", phenoxy acrylate, manufactured by Osaka Organic Chemical Industry Ltd.

ACMO: acryloylmorpholine, "(O)" indicates a compound corresponding to a polymerizable compound having a nitrogen heterocyclic structure and/or a polymerizable compound having a hydroxy group.

4-HBA: 4-hydroxybutyl acrylate, "(O)" indicates a compound corresponding to the polymerizable compound having a nitrogen heterocyclic structure and/or the polymerizable compound having a hydroxy group.

DCPA: dicyclopentenyl acrylate, "(Δ)" indicates a monomer which satisfies "condition A: a volume defined by the van der Waals radii is 0.26 $nm^3$ or more" and "condition B: a height direction area with respect to a long side is 0.25 $nm^2$ or more.

IBXA: isobornyl acrylate, "(Δ)" indicates a monomer which satisfies the "condition A" and the "condition B".

VMOX: vinyl methyl oxazolidinone, "(O)" indicates a compound corresponding to the polymerizable compound having a nitrogen heterocyclic structure and/or the polymerizable compound having a hydroxy group.

VEEA: 2-(2-vinyloxyethoxy)ethyl acrylate.

DPGDA: trade name "SR508", dipropylene glycol diacrylate, manufactured by Sartomer Company Inc., "(Δ)" indicates a monomer which satisfies the "condition A" and the "condition B".

819: trade name "IRGACURE 819", bis(2,4,6-trimethylbenzoyl)-phenylphosphine oxide, manufactured by BASF.

TPO: trade name "IRGACURE TPO", bis(2,4,6-trimethylbenzoyl)-diphenylphosphine oxide, manufactured by BASF.

MEHQ: trade name "p-methoxyphenol", hydroquinone monomethyl ether, manufactured by Kanto Chemical Co., Inc.

BYK-350: trade name, acrylic-based surfactant, abbreviated as "BYK 350", manufactured by BYK.

PW6: C.I. Pigment White 6 (titanium oxide, manufactured by Tayca Corporation).

Solsperse36000: high molecular weight dispersant, manufactured by Lubrizol.

TMCHA: trade name "Viscoat #196", 3,3,5-trimethylcyclohexyl acrylate, manufactured by Osaka Organic Chemical Industry Ltd. "(Δ)" indicates a monomer which satisfies the "condition A" and the "condition B".

LA: trade name "Light Acrylate L-A", lauryl acrylate, manufactured by Kyoeisha Chemical Co., Ltd. "(Δ)" indicates a monomer which satisfies the "condition A" and the "condition B".

TBCHA: trade name "SR217", tert-butylcyclohexanol acrylate, manufactured by Sartomer Company Inc. "(Δ)" indicates a monomer which satisfies the "condition A" and the "condition B".

BYK-UV3500: polyether-modified polydimethylsiloxane having an acryloyl group, manufactured by BYK Additives & Instruments.

PB15:3: C.I. Pigment Blue 15:3.

In Tables 1 and 2, a rate of at least one monofunction monomer to the total mass of the polymerizable compounds in each ink and the surface tension (mN/m) are shown. In addition, in Table 1, a rate of at least one polar monomer with respect to the total mass of the polymerizable compounds in each ink is shown. Furthermore, in Table 2, a rate of at least one monomer which satisfies the "condition A" and the "condition B" with respect to the total mass of the polymerizable compounds in each ink is shown.

In Table 2, the "volume" is the volume of a cavity of a molecule which floats in vacuum and which is formed by the van-der-Waals radii of atoms forming the molecule, the "volume" being calculated using software "COSMOtherm" (manufactured by MOLSIS Inc.).

The "long side" in Table 2 is calculated using software "COSMOtherm" (manufactured by MOLSIS Inc.) and is the longest side obtained in the calculation of the "volume". In more particular, when the structure in which the molecule is most stabilized is modeled, the longest distance between two atoms among the skeleton terminal atoms (such as C, O, and N) was obtained by calculation.

The "volume/long side" in Table 2 represents a value obtained by dividing the above "volume" by the above "long side". This value indicates a cross-sectional area orthogonal to the long side.

3.2. Evaluation Content

The following evaluations were performed on the ink sets of Examples and Comparative Examples shown in FIG. 3.

3.2.1. Evaluation of Wet Spreadability

A contact angle of the over layer ink on an under layer ink coating film formed by a bar coater was evaluated. The evaluation was performed in accordance with the following criteria, and the results are shown in Table 3.

A: 25° or less
B: more than 25° to 28°
C: more than 28° to 30°
D: more than 30°

3.2.2. Evaluation of Burying Property

After 20 ng/dot of the under layer ink was ejected to a recording medium (PET E20), the over layer ink was overcoated on a cured under layer ink in the same conditions as described above, and the burying property was evaluated by visual inspection. The evaluation was performed in accordance with the following criteria, and the results are shown in Table 3.

A: Burring is confirmed by visual inspection even at a distance of less than 30 cm from the recording medium.
B: Burring is confirmed by visual inspection at a distance of 30 cm to less than 1 m from the recording medium.
C: Burring is not confirmed by visual inspection even at a distance of more than 1 m from the recording medium.

3.2.3. Evaluation of Adhesion

After one notch was made in a cured coating film formed by ejecting the ink in an amount of 20 ng/dot on a PVC (poly(vinyl chloride)) film, tape peeling was performed. The evaluation was performed in accordance with the following criteria, and the results are shown in Table 3.

A: No coating film is peeled away.
B: Coating film is partially peeled away.
C: All coating film is peeled away.

3.2.4. Evaluation of Curing Property

After a cotton swab rubbing test was performed on a coating film of each of the under layer ink and the over layer ink, the coating film being formed by ejection thereof in an amount of 20 ng/dot to a PVC (poly(vinyl chloride)) film and then being cured, radiation energy at a tack-free state was evaluated. The evaluation was performed in accordance with the following criteria, and the results are shown in Table 3.

A: Film is cured at less than 200 mJ/cm$^2$.
B: Film is not cured at 200 mJ/cm$^2$ or more.

TABLE 3

| | EXAMPLE 1 | EXAMPLE 2 | EXAMPLE 3 | EXAMPLE 4 | EXAMPLE 5 | EXAMPLE 6 |
|---|---|---|---|---|---|---|
| OVER LAYER INK | U1 | U1 | U1 | U1 | U1 | U3 |
| UNDER LAYER INK | L1 | L2 | L3 | L4 | L5 | L4 |
| DIFFERENCE IN SURFACE TENSION (SURFACE TENSION OF UNDER LAYER INK-SURFACE TENSION OF OVER LAYER INK) | 10.0 | 10.0 | 10.0 | 10.0 | 10.0 | 12.0 |
| WET SPREADABILITY OF OVER LAYER INK | A | A | A | B | A | A |
| BURYING PROPERTY ON RECORDING MEDIUM | A | A | A | B | A | A |
| ADHESION OF UNDER LAYER INK | A | A | A | A | A | A |

TABLE 3-continued

| | | | | | | |
|---|---|---|---|---|---|---|
| CURING PROPERTY OF UNDER LAYER INK | A | A | B | A | B | A |
| ADHESION OF OVER LAYER INK | A | A | A | A | A | A |

| | EXAMPLE 7 | EXAMPLE 8 | COMPARATIVE EXAMPLE 1 | COMPARATIVE EXAMPLE 2 | COMPARATIVE EXAMPLE 3 |
|---|---|---|---|---|---|
| OVER LAYER INK | U2 | U4 | U1 | U1 | U1 |
| UNDER LAYER INK | L1 | L1 | L6 | L7 | L8 |
| DIFFERENCE IN SURFACE TENSION (SURFACE TENSION OF UNDER LAYER INK-SURFACE TENSION OF OVER LAYER INK) | 11.0 | −2.0 | 10.0 | 9.0 | 9.0 |
| WET SPREADABILITY OF OVER LAYER INK | A | C | D | D | A |
| BURYING PROPERTY ON RECORDING MEDIUM | A | B | C | B | A |
| ADHESION OF UNDER LAYER INK | A | A | A | B | C |
| CURING PROPERTY OF UNDER LAYER INK | A | A | A | A | A |
| ADHESION OF OVER LAYER INK | C | C | A | A | A |

3.3. Evaluation Results

In the ink set of each Example in which the under layer ink contains 80.0 percent by mass or more of the monofunctional monomer with respect to the total mass of the polymerizable compounds and 55.0 percent by mass or more of the polymerizable compound having a nitrogen heterocyclic structure and/or the polymerizable compound having a hydroxy group in total with respect to the total mass of the polymerizable compounds, the wet spreadability, the burying property, and the adhesion are all evaluated as excellent. On the other hand, in the ink set of each Comparative Example in which the under layer ink contains less than 80.0 percent by mass of the monofunctional monomer with respect to the total mass of the polymerizable compounds and less than 55.0 percent by mass of the polymerizable compound having a nitrogen heterocyclic structure and/or the polymerizable compound having a hydroxy group in total with respect to the total mass of the polymerizable compounds, it was found that the wet spreadability and the adhesion cannot be simultaneously obtained.

According to the ink set of this embodiment, it is believed that since the under layer ink contains a large amount of the monofunctional polymerizable compound, the flexibility of the coating film is preferable, and the adhesion of an image to be formed to a recording medium is preferable. In addition, it is also found that since the under layer ink contains the polymerizable compound having a polar group, the wet spreadability of the over layer ink is preferable on the coating film, and an image having a preferable burying property can be formed. That is, when the under layer ink contains a large amount of the monofunctional polymerizable compound, even if the surface tension of the over layer ink is simply made different from that of the under layer ink, the wet spreadability of the over layer ink cannot be secured. However, in this ink set, since the under layer ink contains the polymerizable compound having a nitrogen heterocyclic structure and/or the polymerizable compound having a hydroxy group, each of which has a polar portion in its molecule, when this portion is cured, the polar portion appears to the surface of the cured coating film of the under layer ink, and hence, the wet spreadability of the over layer ink is believed to be improved.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions are obtained.

An ink set of radiation curable ink jet compositions is an ink set comprising: an under layer ink; and an over layer ink, and the under layer ink contains, as a polymerizable compound, 80.0 percent by mass or more of a monofunctional polymerizable compound with respect to a total mass of polymerizable compounds and contains 55.0 percent by mass or more of a polymerizable compound having a nitrogen heterocyclic structure and/or a polymerizable compound having a hydroxy group in total with respect to the total mass of the polymerizable compounds.

According to this ink set, since the under layer ink contains a large amount of the monofunctional polymer, the flexibility of the coating film is preferable, and the adhesion of an image to be formed to a recording medium is preferable. In addition, since the under layer ink contains the polymerizable compound having a polar group, the wet spreadability of the over layer ink is preferable on the coating film, and an image having a preferable burring property can be formed. When the under layer ink contains a large amount of the monofunctional polymerizable compound, even if the surface tension of the under layer ink is simply made different from the surface tension of the over layer ink, the wet spreadability of the over layer ink cannot be secured. However according to this ink set, since the under layer ink contains the polymerizable compound having nitrogen heterocyclic structure and/or the polymerizable compound having a hydroxy group, each of which has a polar portion in its molecule, the portion described above appears to the surface of the cured coating film of the under layer ink when being cured, and hence, the surface free energy of the under layer ink is improved, so that the wet spreadability of the over layer ink is improved.

In the ink set described above, the under layer ink may have a surface tension higher than that of the over layer ink.

According to this ink set, the wet spreadability of the over layer ink is further improved.

In the ink set described above, the surface tension of the under layer ink may be higher than the surface tension of the over layer ink by 8.0 mN/m or more.

According to this ink set, the wet spreadability of the over layer ink is further improved.

In the ink set described above, the under layer ink may contain a white pigment.

According to this ink set, an image having a more preferable background shielding property and a preferable visibility may be formed.

In the ink set described above, the over layer ink may contain a non-white pigment.

According to this ink set, an effect obtained by the wet spreadability of the over layer ink is more significant.

In the ink set described above, the under layer ink may contain, as the polymerizable compound, a vinyl group-containing (meth)acrylate represented by the following general formula (I).

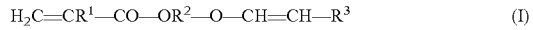

In the formula (I), $R^1$ represents a hydrogen atom or a methyl group, $R^2$ represents a divalent organic residue having 2 to 20 carbon atoms, and $R^3$ represents a monovalent organic residue having 1 to 11 carbon atoms.

According to this ink set, the viscosity of the under layer ink can be further decreased, and in addition, the curing property thereof can also be improved.

In the ink set described above, the over layer ink may contain, as a polymerizable compound, a monofunctional polymerizable compound, and a content of the monofunctional polymerizable compound of the over layer ink may be larger than the content of the monofunctional polymerizable compound of the under layer ink.

According to this ink set, since a content ratio of the monofunctional polymerizable compound of the under layer ink is smaller than a content ratio of the monofunctional polymerizable compound of the over layer ink, the over layer ink is likely to be stretched as compared to the under layer ink, and when a recording medium is bent or stretched in an image forming portion, cracks are not likely to be generated in an image to be formed by the over layer ink.

In the ink set described above, the content of the monofunctional polymerizable compound of the over layer ink with respect to a total mass of polymerizable compounds may be 95.0 percent by mass or more.

According to this ink set, the cracks are not more likely to be generated in the image to be formed by the over layer ink.

In the ink set described above, the over layer ink may contain, as the polymerizable compound, 80.0 percent by mass or more of a polymerizable compound which satisfies the following conditions A and B with respect to the total mass of the polymerizable compounds.

The condition A: a volume defined by the van der Waals radii is 0.26 nm$^3$ or more.

The condition B: a height direction area with respect to a long side is 0.25 nm$^2$ or more.

According to this ink set, since the over layer ink contains a large amount of the bulky polymerizable compound as defined by the conditions A and B, the glossiness of the image formed by the over layer ink is improved.

An ink jet recording method is an ink jet recording method using the ink set described above, and the method comprises: a first adhesion step of adhering the under layer ink to a recording medium; a first curing step of forming an under layer cured film by irradiating the under layer ink on the recording medium with radioactive rays; a second adhesion step of adhering the over layer ink to the under layer cured film; and a second curing step of forming an over layer cured film by irradiating the over layer ink on the under layer cured film with radioactive rays.

According to this ink jet recording method, since the under layer ink contains a large amount of the monofunctional polymerizable compound, the flexibility of the coating film is preferable, and the adhesion of an image to be formed to the recording medium is also preferable. In addition, since the under layer ink contains the polymerizable compound having a polar group, the wet spreadability of the over layer ink is preferable on the coating film, and an image having a preferable burying property may also be formed.

What is claimed is:

1. An ink set of radiation curable ink jet compositions, comprising:
   an under layer ink; and
   an over layer ink,
   wherein the under layer ink contains, as a polymerizable compound, 80.0 percent by mass or more of a monofunctional polymerizable compound with respect to a total mass of polymerizable compounds and contains 55.0 percent by mass or more of a polymerizable compound having a nitrogen heterocyclic structure and/or a polymerizable compound having a hydroxy group in total with respect to the total mass of the polymerizable compounds, and
   wherein the polymerizable compound having the nitrogen heterocyclic structure and/or the polymerizable compound having the hydroxy group is contained in the underlayer ink in an amount of at least 20 percent by mass relative to a total mass of the underlayer ink.

2. The ink set according to claim 1, wherein the under layer ink has a surface tension higher than a surface tension of the over layer ink.

3. The ink set according to claim 1, wherein the surface tension of the under layer ink is higher than the surface tension of the over layer ink by 8.0 mN/m or more.

4. The ink set according to claim 1, wherein the under layer ink contains a white pigment.

5. The ink set according to claim 1, wherein the over layer ink contains a non-white pigment.

6. The ink set according to claim 1, wherein the under layer ink contains, as the polymerizable compound, a vinyl group-containing (meth)acrylate represented by the following general formula (I),

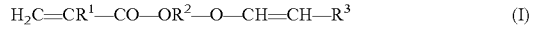

where in the formula (I), $R^1$ represents a hydrogen atom or a methyl group, $R^2$ represents a divalent organic residue having 2 to 20 carbon atoms, and $R^3$ represents a monovalent organic residue having 1 to 11 carbon atoms.

7. The ink set according to claim 1, wherein the over layer ink contains, as a polymerizable compound, a monofunctional polymerizable compound, and a content of the monofunctional polymerizable compound of the over layer ink is larger than the content of the monofunctional polymerizable compound of the under layer ink.

8. The ink set according to claim 1, wherein the over layer ink contains, as a polymerizable compound, a monofunctional polymerizable compound, and a content of the monofunctional polymerizable compound of the over layer ink with respect to a total mass of polymerizable compounds is 95.0 percent by mass or more.

9. The ink set according to claim 1, wherein the over layer ink contains, as a polymerizable compound, 80.0 percent by mass or more of a polymerizable compound which satisfies the following conditions A and B with respect to a total mass of polymerizable compounds, where the condition A indicates that a volume defined by the van der Waals radii is 0.26 $nm^3$ or more, and the condition B indicates that a height direction area with respect to a long side is 0.25 $nm^2$ or more.

10. An ink jet recording method using the ink set according to claim 1, the method comprising:

a first adhesion step of adhering the under layer ink to a recording medium;

a first curing step of forming an under layer cured film by irradiating the under layer ink on the recording medium with radioactive rays;

a second adhesion step of adhering the over layer ink to the under layer cured film; and a second curing step of forming an over layer cured film by irradiating the over layer ink on the under layer cured film with radioactive rays.

* * * * *